United States Patent [19]
Lange et al.

[11] 3,880,620
[45] Apr. 29, 1975

[54] METHOD FOR SCRUBBING GASES DERIVED FROM BLAST FURNACES

[75] Inventors: K. Robert Lange, Huntingdon Valley; Yuan Tsun Hsu, Cornwells Heights, both of Pa.

[73] Assignee: Betz Laboratories, Inc., Trevose, Pa.

[22] Filed: June 19, 1974

[21] Appl. No.: 480,654

[52] U.S. Cl. .............................. 55/72; 55/73; 55/84
[51] Int. Cl. ............................................ B01d 47/02
[58] Field of Search .............. 55/68, 72, 73, 84, 85, 55/90, 93, 94

[56] References Cited
UNITED STATES PATENTS
3,633,340   1/1972   Illingworth .............................. 55/84

*Primary Examiner*—Charles N. Hart
*Attorney, Agent, or Firm*—Alexander D. Ricci

[57] ABSTRACT

The present invention is directed to a method of controlling deposition during the scrubbing of waste flue gases derived from blast furnace iron producing operations. The invention specifically calls for the spraying of the flue gases with an aqueous medium containing the combination comprising in a weight ratio basis of 1:10 to 10:1 of an acrylic acid polymer having an average number molecular weight of from about 750 to about 100,000 and an organo-phosphonate having the chemical formula:

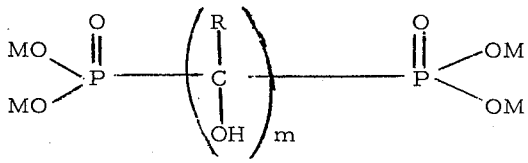

where *m* is an integer of 1 to 10, R is hydrogen or alkyl of 1:4 carbonatoms and M is hydrogen or a water-soluble cation. The aqueous medium ideally should contain from about 0.5 to about 100 parts per million of the combination.

6 Claims, No Drawings

METHOD FOR SCRUBBING GASES DERIVED FROM BLAST FURNACES

BACKGROUND OF THE INVENTION

During recent years, the number of wet scrubber systems installed to remove gaseous and particulate material from waste stack gases has increased tremendously. Additional such systems are on the drawing board now. These wet scrubbers are being used to clear effluent from boiler stacks, incinerator stacks, lime kilns, foundries, blast furnaces, basic oxygen furnaces (BOF), open hearth units, coke plants, paper mill recovery boilers, pet food manufacturing facilities, electric furnaces (steel and aluminum), smelters, asphalt plants and many others.

One of the most important features of a scrubber system is the contact chamber, the device used to effect transfer of gaseous and/or particulate matter from the gas to the water phase. Most wet scrubber systems involve a venturi, a packed bed, an orifice plate, a spray chamber or a turbulent bed. Some systems even use two contact chambers in series, for example, a venturi followed by a spray chamber.

Venturi or orifice plate scrubbers are generally more efficient for particulate removal while packed beds, turbulent beds and spray chambers are usually more efficient for removing gaseous components such as $SO_2$ and HF.

The present invention is directed specifically to those scrubber systems where scaling and deposition problems due to insoluble calcium carbonate, iron oxide ($Fe_2O_3$), iron ore fines and slag fines are encountered. The type problem which the present invention minimizes is that which is found in gas scrubber systems of blast furnace operations where iron ore is being converted or processed to iron having a high carbon content.

In order to assure a complete understanding of the problem to which the present invention is addressed, a brief description of a blast furnace operation is hereafter provided.

In the production of iron, iron ore is fed together with additional ingredients such as dolomite through the top of a blast furnace fired by coke. An air stream is blown upward from the bottom of the furnace through the subsequent molten materials. The carbon of the coke reduces the iron ore ($Fe_2O_3$) to iron metal. The molten iron is tapped from the bottom of the furnace while the slag is tapped from the middle of the furnace. The by-product of the carbon reduction is of course a combination of carbon dioxide and carbon monoxide which reacts with the calcium present to form the troublesome scaleformer, calcium carbonate and other solids: clay, slag, fines, etc.

As can be appreciated, the air stream blown upward contributes significantly to the impurity content of the flue gas, thus putting an extreme burden on the scrubbing system. The particulate load in the scrubbing medium ranges from about 1,000 to 2,000 parts per million because of the particulate load of the flue gas.

The scrubbers that are used in blast furnace clean-up are often of the Venturi design and treat the off-gases from the furnace. These gases contain significant quantities of iron oxide, whose fine particle size allows it to be carried off in the gas stream. Also present may be coke fines, to a lesser extent and to some extent, particulate slag materials usted, such as silicates and unused dolomites. The iron oxide has been subjected to high temperatures within the furnace and may therefore be in a sintered form of low surface activity. However, its fine particle size presents deposition problems in scrubbers and delivery lines.

Since HCN and $(CN)_2$ are also present in the gases, it has been the practice to maintain scrubber pH above 5 so as to maximize the formation of CN in the water or minimize undissociated, volatile HCN by high pH control. $CO_2$ is also present in high concentrations and serves to maintain the pH in the desired range by acting as an acid buffer. CO is a definite problem in this application. It is generally economical to use the CO as a fuel in a waste heat boiler, but significant amounts can remain dissolved in the scrubber effluent. Its toxicity and vapor density make it hazardous as a chemical, while its combustibility may present an explosion and fire hazard.

Although each of the various particulates contributed to the overall problem, the most significant factor was believed to be the iron oxide ($Fe_2O_3$) content of the flue gas.

Since it was the present inventors' belief that if the iron oxide deposition problems could be minimized, the overall effectiveness and, of course, the economics of the scrubbing system could be greatly enhanced, we engaged in a research program designated to produce a method of minimizing the effect of iron oxide and calcium carbonate deposition.

During this program, it was discovered that if a combination comprising a weight ratio basis of from about 1:10 to about 10:1 and preferably 1:5 to 5:1, of a water-soluble acrylic acid polymer having an average number molecular weight of from about 750 to 100,000 or water-soluble salt thereof (Na, K, $NH_4$) and an organo-phosphonate having the chemical formula:

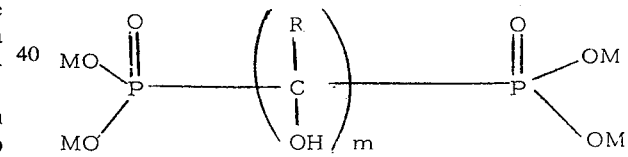

where $m$ is an integer of 1 to 10, R is hydrogen or alkyl of 1 to 4 carbonations, and M is hydrogen or a water soluble cation such as sodium, potassium or ammonium; were added to the scrubbing medium in an amount of from 0.5 to about 300 preferably from about 1 to about 75 ppm, that the deposition of iron oxide ($Fe_2O_3$) and calcium carbonate could be effectively controlled so as to permit a more effective scrubbing operation. The acrylic acid polymers found to be most effective were those having an average number molecular weight of from about 1,000 to 10,000. The phosphonates which possess enhanced activity are those having the shorter chain or more specifically the lower $m$ values.

In order to establish the efficacy of the invention, various testing techniques were utilized and are described as follows:

SCREENING STUDY

This study involved adding Product A, described in the following, to the suspension of $Fe_2O_3$ which was obtained in an agglomerated form. Agitation for a standard length of time then breaks up the agglomerates, the degree of deflocculation or deagglomeration obtained is measured directly after agitation by light transmission (measure of turbidity). Reduced transmission is due to an increase in the number of particles in the light beam and this is the result of agglomerate disintegration. The testing technique is good for initial screening. The test parameters and the formulation for Product A are shown in Table 1.

In this test the difference in reading between control (no treatment) and sample is positive for material which inhibits $Fe_2O_3$ deposition and negative for flocculants.

TABLE 1

| Conditions of Test: | 1,000 ppm $Fe_2O_3$ (Suspension weight) pH = 7.5 Total hardness 200 ppm Treatment: 10 ppm Control − (minus) Sample = % Transmission |
|---|---|

PRODUCT A (FORMULATION)

25 percent organo-phosphorate having the formula

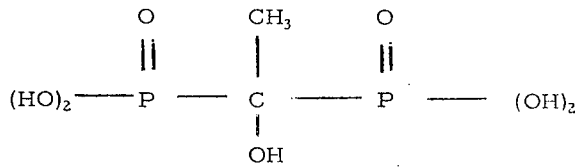

10 percent Polyacrylic acid having an average number molecular weight of less than 10,000

29 percent Caustic (solubilizing agent 50 percent solution)

36 percent Water

DISPERSION OF IRON OXIDE

The screening procedure outlined above measures deflocculation since the suspension is not allowed to settle before readings are taken. To measure dispersion of particles it is necessary to allow settling to take place and to measure the degree of which particles are maintained in suspension. In the present tests, two hours were allowed for settling time after the agitation step with the supernatant 40 ml being measured by light transmission as before. This was repeated at suspension initial pH values of from 6.5 to 10.

With minor exceptions, Product A provided quite impressive results. On those instances where unimpressive results were obtained, quite satisfactory results were possible by increasing the treatment dosage. The data recorded in the following Table indicates, as in the case for most products, that the products, that the product has preferred operating conditions.

TABLE 2

| TEST | TEST CONDITIONS | | TREATMENT ppm | DISPERSION Δ % Transmission (Control minus sample) |
|---|---|---|---|---|
| | pH | $Fe_2O_3$ conc. ppm | | |
| 1 | 6.6±0.2 | 1000 | 10 | 7.5 |
| 2 | " | " | 25 | 14.0 |
| 3 | " | " | 75 | 25.5 |
| 4 | 7.6±0.3 | 1000 | 10 | 4.5 |
| 5 | " | " | 25 | 10.0 |
| 6 | " | " | 50 | 0.5 |
| 6(a) | " | " | 75 | 10.0 |
| 7 | 8.9±0.2 | " | 10 | 7.0 |
| 8 | " | " | 25 | 18.5 |
| 9 | " | " | 50 | 12.5 |
| 10 | " | " | 75 | 33.5 |
| 11 | 7.0±0.2 | 3000 | 10 | 7.0 |
| 12 | " | " | 25 | 12.5 |
| 13 | " | " | 50 | −4.5 |
| | | | 75 | 6.5 |
| 14 | 9.9±0.2 | 3000 | 10 | 7.5 |
| 15 | " | " | 25 | 9.0 |
| 16 | " | " | 50 | 6.0 |
| 17 | " | " | 75 | 12.0 |

The data for the most part indicates that the actives of the product in most instances absorb strongly and completely on the iron oxide surfaces. This is believed to be the reason for the high activity shown in this test.

SIMULATED SCRUBBER TESTS

In order to more clearly assimilate the problems experienced in a scrubbing operation, a small Venturi scrubber was designed and constructed.

The Venturi scrubber which was made from glass parts having ground joints and an adjustable throat to regulate the flow pattern, consists of a scrubber, a reservoir and a pump. The iron oxide suspension used for the testing is pumped from the reservoir to the scrubber. It enters at the top of the scrubber through a vertical tube located inside the scrubber. The tip of the tube is located just above the adjustable throat. The suspension is forced to spray on the top of the adjustable throat. This induces, at the throat, a vigorous mixing of the suspension with the air which is being sucked from the opening at the top section of the scrubber. After the mixing, the suspension flows down to the conical sump of the scrubber and finally returns to the reservoir. Any deposition built-up in the internal of the scrubber can be observed visually.

Iron oxide ($Fe_2O_3$) samples including pure iron oxide and actual iron oxide deposits obtained from blast furnaces have been used to evaluate the treatment's effectiveness in preventing and removing the deposition of these samples in the internals of the scrubber.

The testing conditions were: 0.3 percent iron oxide in tap water at a pH of 8 and a circulation rate of 2 l/min.

OBSERVATIONS RELATIVE TO THE SPECIFIC TEST

1. Deposition of iron oxide in the scrubber internals took place immediately in the absence of treatment. In one-half hour sufficient deposit build-ups were readily apparent.

2. When 50 ppm of Product A was added to a fresh suspension of the $Fe_2O_3$ prior to start of scrubbing, deposition was substantially prevented.

3. On a second series of experiments, iron oxide ($Fe_2O_3$) was just deposited for one-half hour and cleanup attempted by adding Product A after the one-half hour interval. It was proved that the treatment removed the irox oxide quite effectively.

In order to simulate the presence of calcium oxide, the hardness was increased to 1,875 ppm Ca (as $CaCO_3$), with recirculation as before. In the absence of treatment $CaCO_3$ precipitated (1,400 ppm of the 1,875 ppm introduced precipitated) and formed around the $Fe_2O_3$ particles. Deposition took place in the scrubber. In the presence of Product A at 50 ppm, the extent of $CaCO_3$ precipitation was decreased to 50 percent of the previous (700 ppm precipitated as compared to 1400 ppm) and the $CaCO_3$ crystals were separate from the iron oxide particles. Deposition was prevented in the scrubber.

STAINLESS STEEL ADHESION TESTS

In order to substantiate the above results, iron oxide samples including pure iron oxide and iron oxide deposits obtained from blast furnaces were used to evaluate Product A's effectiveness in preventing and removing deposit from stainless steel surfaces. The test was done by stirring the suspension at 1,000 rpm with a stainless steel propeller. The deposition and its removal were observed on the stainless steel surface. The experimental conditions of concentration and pH and the way that the treatment was added were the same as in the Venturi scrubber test earlier described.

The same conclusions found in the scrubber test can be drawn in this test, i.e., the results were similar on the glass surface and the stainless steel surface.

Although the tests were concluded using the formulation of Product A, it was clear to the inventors that any combination of the organo-phosphonate and acrylic acid polymer would function quite satisfactorily since the ingredients possess both crystalization inhibition and dispersant properties.

Since iron oxide ($Fe_2O_3$) and calcium carbonate are the primary problems in blast furnace scrubbing systems, the control of these problem-causers generally permits control of the other problem-causers, i.e., ore fines, slags, etc., found in the gas. Iron oxide and calcium carbonate appear to influence the behavior of the other problem causers.

We claim:

1. A method of scrubbing flue gases from a blast furnace for iron production which comprises treating said gases with an aqueous medium contains from about 0.5 to 300 parts per million of a composition comprising on a weight ratio basis from about 1:10 to 10:1 of:

i an organo-phosphonate having the formula:

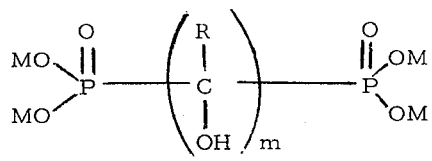

wherein $m$ is an integer of from 1 to 10, R is hydrogen or an alkyl of from 1 to 4 carbon atoms, and M is hydrogen or a watersoluble cation, and ii a water-soluble acrylic acid polymer having an average number molecular weight of from about 750 to about 10,000 or water-soluble salt thereof.

2. A method according to claim 1 wherein the composition has a weight ratio of 1:5 to 5:1 of said acrylic acid polymer and said phosphonate.

3. A method according to claim 1 wherein the acrylic acid polymer has a molecular weight of less than 10,000.

4. A method according to claim 3 wherein the phosphonate has the formula:

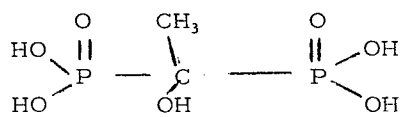

and said polymer is a polyacrylic acid polymer.

5. A method according to claim 4 wherein the aqueous medium contains from about 1 to 75 parts per million of said composition.

6. A method according to claim 5 wherein the aqueous medium is sprayed on the gases.

* * * * *